Oct. 9, 1951  A. F. O'CONNOR  2,570,371
SNUBBER
Filed Feb. 23, 1946
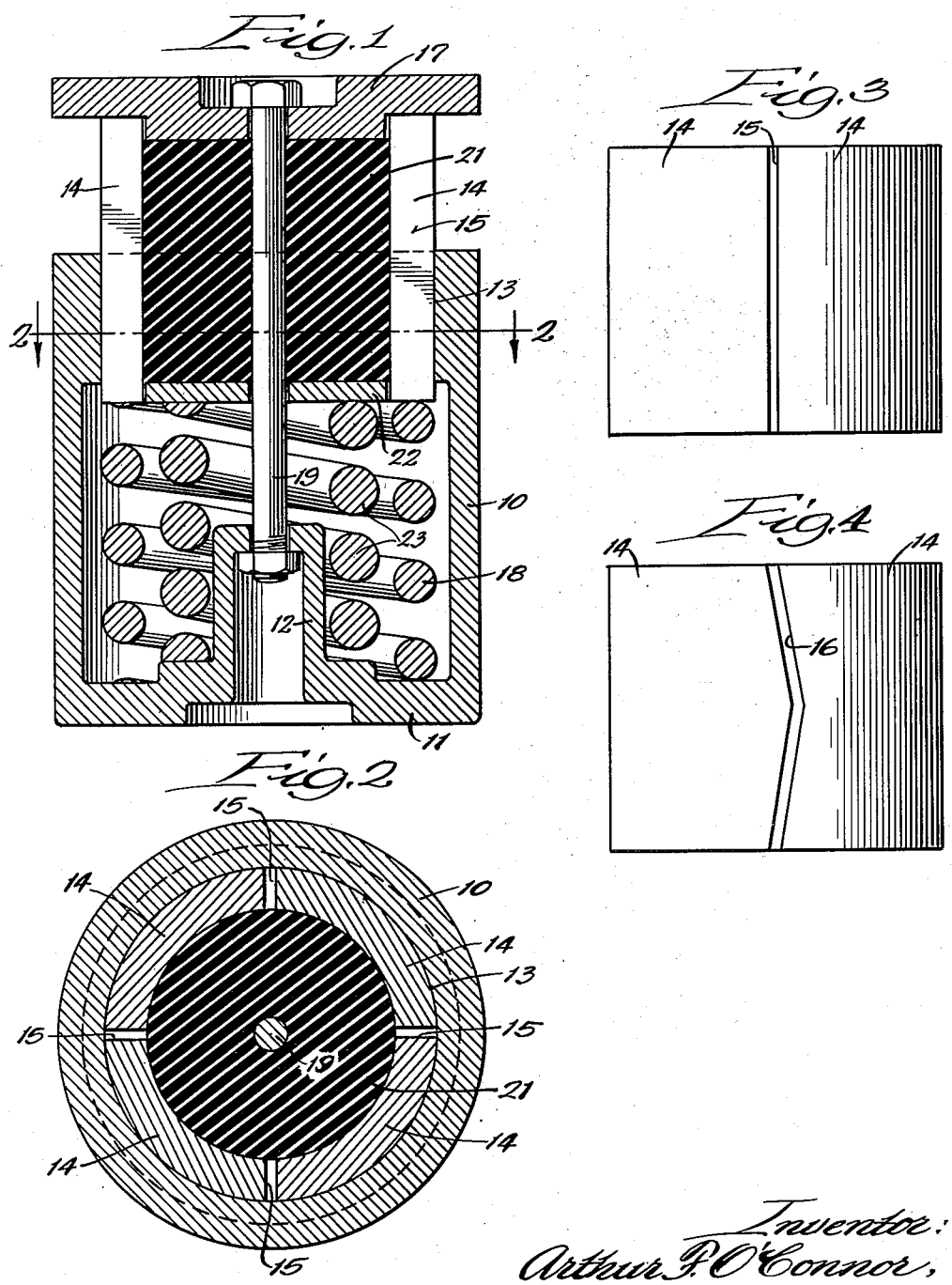

UNITED STATES PATENT OFFICE 2,570,371

SNUBBER

Arthur F. O'Connor, Chicago, Ill., assignor to Union Asbestos & Rubber Company, a corporation of Illinois Application February 23, 1946, Serial No. 649,647

3 Claims. (Cl. 267—9)

This invention relates to snubbers and more particularly to snubbers of the type adapted to be substituted for one or more of the usual coil springs in a railway truck suspension, draft gear, or the like to prevent the development of harmonics.

One of the objects of the invention is to provide a snubber in which relative movement of the parts is opposed by friction which is variable in accordance with the movement.

Another object is to provide a snubber in which frictionally engageable parts are variably forced into engagement in response to a spring force which varies in accordance with the movement of the parts.

Still another object is to provide a snubber in which a block of rubber or like material is utilized to produce expansion of a slit sleeve against a casing into which it telescopes.

The above and other objects and advantages of the invention will be more readily apparent from the following description when read in connection with the accompanying drawing, in which:

Figure 1 is an axial section through a snubber embodying the invention;

Fig. 2 is a section on the line 2—2 of Fig. 1;

Fig. 3 is a side elevation of the sleeve; and

Fig. 4 is a view similar to Fig. 3, illustrating an alternative construction.

The snubber as shown comprises a tubular casing or housing 10, closed at one end by an integral end closure 11 formed with an inwardly extending hollow boss 12. The opposite end of the casing 10 is open and is thickened to provide an annular friction surface 13 of slightly smaller diameter than the main body of the casing.

The casing is adapted to receive a slit sleeve 14 which is longitudinally divided to provide a number of segments, shown as 4. The sleeve 14 may be slit along straight axial lines as indicated at 15 in Fig. 3, or if preferred, may be slit along V-shaped lines, as indicated at 16 in Fig. 4. The latter construction has the advantage that it tends to prevent relative displacement of the sleeve segments, although it is slightly more expensive than the construction of Fig. 3. The sleeve segments at their upper ends engage a top pressure plate 17 which is of substantially the same external diameter as the casing 10.

Movement of the sleeve parts into the casing is yieldingly resisted by a coil spring 18 mounted in the casing, and centered by the boss 12. At its upper end, the spring 18 engages the lower ends of the sleeve segments 14 to urge them out of the casing. Outward movement of the segments is limited by a bolt 19 extending through the sleeve and having its head and a nut on its threaded end seating respectively in a recess in the pressure plate 17 and in the tubular boss 12.

As the pressure plate 17 is moved toward the casing to slide the sleeve into the casing, the segments 14 are separated or expanded into frictional engagement with the annular surface 13. For this purpose, a block 21 of rubber-like material, such as natural or synthetic rubber or a suitable resilient plastic, is mounted in the sleeve. Preferably, the segments 14 are bonded to the block 21 to assist in holding the segments in place. The block 21 seats at its upper end against the pressure plate 17, and at its lower end is engaged by a ring 22 which seats against a coil spring 23.

When a load is applied to the snubber, tending to compress the parts, the spring 23 will be compressed to force the ring 22 against the block 21. Under these conditions, the block 21 expands to press the segments 14 into engagement with the surface 13 with a force proportional to the force exerted by the spring 23. It will be understood that by proper design of the spring 23 as to free length and spring rate, any desired pre-compression can be obtained initially to hold the segments against the friction surface 13 with any desired amount of force. This frictional effect resists collapsing and re-expansion of the snubber unit with a sliding frictional force which varies with displacement of the snubber parts positively to prevent the setting up of any harmonics in the spring suspension system.

While one embodiment of the invention has been shown and described in detail, it will be understood that this is illustrative only and is not to be taken as a definition of the scope of the invention, reference being had for this purpose to the appended claims.

What is claimed is:

1. A snubber comprising a tubular casing open at one end, an expansible sleeve slidable in the open end of the casing, a spring in the casing acting directly between the casing and the sleeve to urge the sleeve out of the casing, a second spring in the casing, and means in the sleeve engaging the second spring to expand the sleeve into frictional engagement with the casing in response to the force of the second spring and independently of the force of the first spring and a pressure plate engaging the outer end of the sleeve and the expanding means to press the sleeve into the casing against the first spring and to press the expanding means against the second spring.

2. A snubber comprising a tubular casing open at one end, an expansible sleeve slidable in the open end of the casing, a spring in the casing acting directly between the casing and the sleeve to urge the sleeve out of the casing, a second spring in the casing, and a mass of resilient material in the sleeve positioned to receive the force of the second spring independently of the force of the first spring and a pressure plate engaging the outer ends of the sleeve and the mass of resilient material to press the sleeve into the casing against the first spring and to press the mass of resilient material against the second spring.

3. A snubber comprising a tubular cup shaped casing having an elongated portion of reduced diameter defining a friction surface at one end, a tubular sleeve longitudinally divided into a plurality of radially expansible segments slidable in said portion of said casing, a spring bottomed against the bottom of said casing and said sleeve resiliently to oppose inward axial sliding movements of said sleeve, a block of rubber-like material disposed within said sleeve and bonded to the segments thereof, a second spring bottomed against the bottom of said casing and operative to urge said block outwardly independently of the position of said sleeve, a pressure plate disposed to engage the outer ends of said sleeve and said block, said pressure plate, said block, and said casing having aligned openings defining a cylindrical channel, and a stop member extending through said channel and having end portions to engage said plate and said casing to limit outward movement of said plate.

ARTHUR F. O'CONNOR.

REFERENCES CITED

The following references are of record in the file of this patent:

UNITED STATES PATENTS

| Number | Name | Date |
| --- | --- | --- |
| 2,010,623 | Bugatti | Aug. 6, 1935 |
| 2,055,242 | Smith | Sept. 22, 1936 |
| 2,212,759 | Tea | Aug. 27, 1940 |
| 2,265,392 | Olander | Dec. 9, 1941 |